(12) United States Patent
Bhusarapu et al.

(10) Patent No.: US 9,394,180 B2
(45) Date of Patent: Jul. 19, 2016

(54) PRODUCTION OF POLYCRYSTALLINE SILICON IN SUBSTANTIALLY CLOSED-LOOP SYSTEMS

(71) Applicant: SunEdison, Inc., Maryland Heights, MO (US)

(72) Inventors: Satish Bhusarapu, Houston, TX (US); Yue Huang, Midlothian, VA (US); Puneet Gupta, Houston, TX (US)

(73) Assignee: SunEdison, Inc., Maryland Heights, MO (US)

( * ) Notice: Subject to any disclaimer, the term of this patent is extended or adjusted under 35 U.S.C. 154(b) by 605 days.

(21) Appl. No.: 13/871,205

(22) Filed: Apr. 26, 2013

(65) Prior Publication Data

US 2013/0236367 A1    Sep. 12, 2013

Related U.S. Application Data

(63) Continuation of application No. 12/910,540, filed on Oct. 22, 2010, now abandoned, and a continuation of application No. 12/910,553, filed on Oct. 22, 2010, now Pat. No. 8,449,848.

(51) Int. Cl.
*C01B 33/03* (2006.01)
*B01J 8/24* (2006.01)
*C01B 33/039* (2006.01)
*C01B 33/107* (2006.01)

(52) U.S. Cl.
CPC . *C01B 33/03* (2013.01); *B01J 8/24* (2013.01); *C01B 33/039* (2013.01); *C01B 33/10742* (2013.01); *C01B 33/10763* (2013.01); *C01B 33/10773* (2013.01)

(58) Field of Classification Search
CPC .................. C01B 33/03; C01B 33/10763
See application file for complete search history.

(56) References Cited

U.S. PATENT DOCUMENTS

| | | |
|---|---|---|
| 3,565,590 A | 2/1971 | Bracken |
| 3,933,985 A | 1/1976 | Rodgers |
| 4,092,446 A | 5/1978 | Padovani et al. |
| 4,117,094 A | 9/1978 | Blocher, Jr. et al. |
| 4,318,942 A | 3/1982 | Woerner et al. |
| 4,526,769 A | 7/1985 | Ingle et al. |
| 4,676,967 A | 6/1987 | Breneman |
| 4,868,013 A | 9/1989 | Allen |
| 4,992,245 A | 2/1991 | Van Slooten et al. |
| 5,382,412 A | 1/1995 | Kim et al. |

(Continued)

FOREIGN PATENT DOCUMENTS

| | | |
|---|---|---|
| CN | 101497442 | 8/2009 |
| CN | 102030329 | 4/2011 |

(Continued)

OTHER PUBLICATIONS

Co-Owned U.S. Appl. No. 12/910,553; Entitled: Production of Polycrystalline Silicon in Substantially Closed-Loop Systems; filed Oct. 22, 2010; pp. 26.

(Continued)

*Primary Examiner* — Lessanework Seifu
(74) *Attorney, Agent, or Firm* — Armstrong Teasdale LLP

(57) ABSTRACT

Production of polycrystalline silicon in a substantially closed-loop process is disclosed. The processes generally include decomposition of trichlorosilane produced from metallurgical grade silicon.

21 Claims, 5 Drawing Sheets

(56) References Cited

U.S. PATENT DOCUMENTS

| | | |
|---|---|---|
| 5,871,705 A | 2/1999 | Sakata et al. |
| 6,368,568 B1 | 4/2002 | Lord |
| 6,849,244 B2 | 2/2005 | Konig et al. |
| 6,932,954 B2 | 8/2005 | Wakamatsu et al. |
| 7,029,632 B1 | 4/2006 | Weidhaus et al. |
| 2002/0102850 A1 | 8/2002 | Kim et al. |
| 2007/0248521 A1 | 10/2007 | Kutsovsky et al. |
| 2008/0056979 A1 | 3/2008 | Arvidson et al. |
| 2008/0241046 A1 | 10/2008 | Hertlein et al. |
| 2008/0267834 A1 | 10/2008 | Kim et al. |
| 2008/0299291 A1 | 12/2008 | Weidhaus et al. |
| 2009/0004090 A1 | 1/2009 | Kim et al. |
| 2009/0060820 A1 | 3/2009 | Shimizu et al. |
| 2009/0095710 A1 | 4/2009 | Kim et al. |

FOREIGN PATENT DOCUMENTS

| | | |
|---|---|---|
| CN | 102180467 | 9/2011 |
| DE | 3024319 A1 | 1/1982 |
| DE | 19948395 A1 | 5/2001 |
| GB | 2028289 A | 3/1980 |
| JP | 5717415 | 1/1982 |
| JP | 60008969 | 8/1985 |
| JP | 11049508 | 5/1998 |
| WO | 2004011372 A1 | 2/2004 |
| WO | 2011002748 A1 | 1/2011 |
| WO | 2011085902 A1 | 7/2011 |

OTHER PUBLICATIONS

Co-Owned U.S. Appl. No. 12/910,465; Entitled: Production of Polycrystalline Silicon by the Thermal Decomposition of Trichlorosilane in a Fluidized Bed Reactor; filed Oct. 22, 2010; pp. 25.

PCT International Search Report and Written Opinion of the International Searching Authority mailed on Jan. 30, 2012 regarding PCT/US2011/052691; pp. 15.

Non-Final Office Action; U.S. Appl. No. 12/910,553; dated May 8, 2012; pp. 15.

Non-Final Office Action; U.S. Appl. No. 12/910,540; dated Jan. 23, 2013; pp. 13.

Final Office Action; U.S. Appl. No. 12/910,540; dated Aug. 21, 2013; pp. 11.

Final Office Action; U.S. Appl. No. 12/910,553; dated Nov. 7, 2012; pp. 13.

Notice of Allowance; U.S. Appl. No. 12/910,553; dated Feb. 1, 2013; pp. 7.

Co-Owned U.S. Appl. No. 12/910,540; Entitled: Production of Polycrystalline Silicon in Substantially Closed-Loop Processes; filed Oct. 22, 2010; pp. 31.

PRODUCTION OF POLYCRYSTALLINE SILICON IN SUBSTANTIALLY CLOSED-LOOP SYSTEMS

CROSS-REFERENCE TO RELATED APPLICATION

This application is a continuation of U.S. patent Ser. No. 12/910,540, filed Oct. 22, 2010 and is a continuation of U.S. patent Ser. No. 12/910,553, filed Oct. 22, 2010, both of which are incorporated herein by reference.

BACKGROUND

The field of the present disclosure relates to production of polycrystalline silicon in a substantially closed-loop process and, particularly, processes that include decomposition of trichlorosilane produced from metallurgical grade silicon.

Polycrystalline silicon is a vital raw material used to produce many commercial products including, for example, integrated circuits and photovoltaic (i.e., solar) cells. Polycrystalline silicon is often produced by a chemical vapor deposition mechanism in which silicon is deposited from a thermally decomposable silicon compound onto silicon particles in a fluidized bed reactor or onto silicon rods as in a Siemens-type reactor. The seed particles continuously grow in size until they exit the reactor as polycrystalline silicon product (i.e., "granular" polycrystalline silicon). Suitable decomposable silicon compounds include, for example, silane and halosilanes such as trichlorosilane.

Trichlorosilane may be produced by contacting hydrogen chloride with a source of silicon as shown in the reaction below,

$$Si + 3HCl \rightarrow SiHCl_3 + H_2 \qquad (1),$$

or by contacting silicon tetrachloride and hydrogen with a source of silicon as shown in the reaction below,

$$Si + 3SiCl_4 + 2H_2 \rightarrow 4SiHCl_3 \qquad (2).$$

Hydrogen chloride and silicon tetrachloride are relatively expensive components in trichlorosilane-based production of polycrystalline silicon.

A continuing need exists for processes for producing polycrystalline silicon by thermal decomposition of trichlorosilane that reduce the amount of hydrogen and chlorine used relative to conventional methods and for methods that are capable of producing polycrystalline silicon in a substantially closed-loop process relative to hydrogen chloride. A continuing need also exists for systems for producing polycrystalline silicon that make use of such processes.

SUMMARY

One aspect of the present disclosure is directed to a system for producing polycrystalline silicon by decomposition of trichlorosilane. The system is substantially closed-loop with respect to trichlorosilane. The system includes a chlorination reactor in which hydrogen chloride is contacted with silicon to produce trichlorosilane and silicon tetrachloride. The system includes a fluidized bed reactor in which trichlorosilane is decomposed to produce polycrystalline silicon. The system also includes a hydrogenation reactor in which silicon tetrachloride and hydrogen are introduced to produce trichlorosilane.

Another aspect of the present disclosure is directed to a system for producing polycrystalline silicon by decomposition of trichlorosilane. The system is substantially closed-loop with respect to trichlorosilane. The system includes a chlorination reactor in which hydrogen chloride is contacted with silicon to produce trichlorosilane and silicon tetrachloride. The system includes a first fluidized bed reactor in which trichlorosilane is decomposed to produce polycrystalline silicon. The system includes a second fluidized bed reactor in which silicon tetrachloride is contacted with hydrogen and particulate silicon to produce trichlorosilane.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

In accordance with the present disclosure, substantially closed-loop processes and systems for producing polycrystalline silicon from trichlorosilane are provided. As used herein, the phrases "substantially closed-loop process" or "substantially closed-loop system" refers to a process or system in which the compound with respect to which the system or process is substantially closed-loop is not withdrawn into the system or process other than as an impurity and is not fed into the system or process other than as in a make-up stream. As used herein, the systems and processes are substantially closed-loop with respect to all compounds other than silicon such as, for example, trichlorosilane, silicon tetrachloride, hydrogen chloride and/or hydrogen.

Closed-Loop Processes for Producing Polycrystalline Silicon

Figure 1:
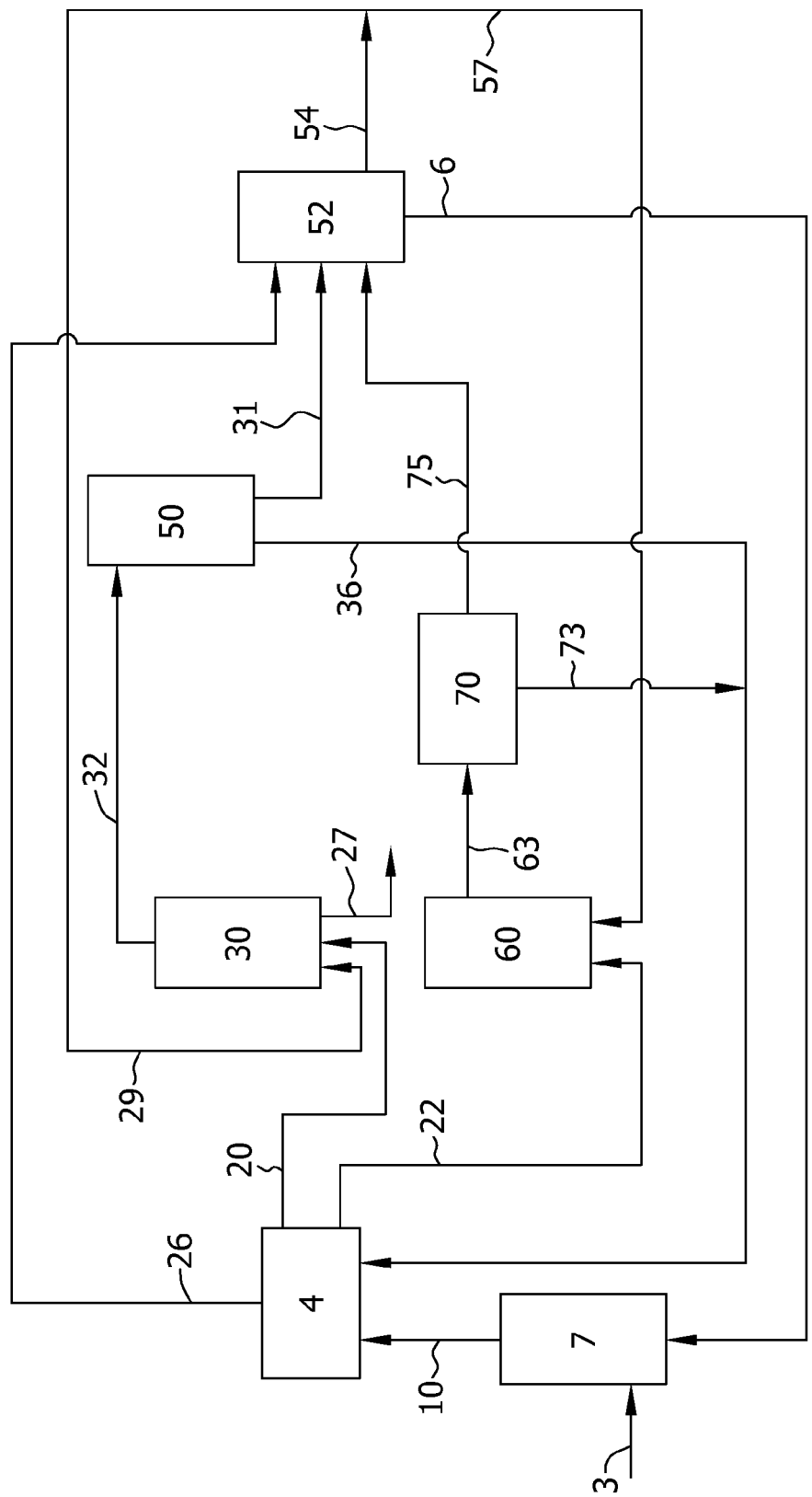
FIG. 1 is a flow diagram of a system for producing polycrystalline silicon by the thermal decomposition of trichlorosilane according to a first embodiment of the present disclosure.

In several embodiments of the present disclosure and as shown in FIG. 1, a source of silicon 3 and hydrogen chloride 6 are introduced and contacted in a chlorination reactor 7 to produce a chlorinated product gas 10. The chlorinated product gas 10 contains trichlorosilane and silicon tetrachloride as well as hydrogen and unreacted hydrogen chloride. Trichlorosilane and silicon tetrachloride may be produced in the chlorination reactor 7 according to the following reactions, $$Si+3HCl \rightarrow SiHCl_3+H_2 \quad (3),$$

$$SiHCl_3+HCl \rightarrow SiCl_4+H_2 \quad (4).$$

In this regard it should be understood that, as used herein, "contact" of two or more reactive compounds generally results in a reaction of the components and the terms "contacting" and "reacting" are synonymous as are derivations of these terms and these terms and their derivations should not be considered in a limiting sense. Typically the source of silicon 3 is metallurgical grade silicon; however, it should be understood that other sources of silicon may be used such as, for example, sand (i.e., $SiO_2$), quartz, flint, diatomite, mineral silicates, fluorosilicates and mixtures thereof. It is preferred that the particle size of the silicon be from about 10 μm to about 750 μm or from about 50 μm to about 250 μm. Increasing the particle size decreases the reaction rate while smaller sizes result in more particles being entrained in spent reactor gases and difficulty in fluidization as a result of increased cohesive forces among the smaller diameter particles.

The chlorination reactor 7 may be a fluidized bed reactor in which silicon 3 is suspended in the incoming hydrogen chloride gas 6. The reactor 7 may be operated at a temperature of at least about 250° C. and, in other embodiments, at least about 300° C. (e.g., from about 250° C. to about 450° C. or from about 300° C. to about 400° C.). In view of the exothermic nature of reactions (3) and (4), the chlorination reactor 7 may include cooling means (e.g., cooling coils in thermal communication with the reactor bed or a cooling jacket) to assist in controlling the temperature of the reactor. In this regard, it should be understood that while the chlorination reactor 7 may be a fluidized bed reactor, it should be understood that, as used herein, the chlorination reactor should be distinguished from the "first fluidized bed reactor" and the "second fluidized bed reactor" described below.

The reactor 7 may be operated at a pressure (i.e., overhead gas pressure) of at least about 1 bar such as, for example, from about 1 bar to about 10 bar, from about 1 bar to about 7 bar or from about 2 bar to about 5 bar. The incoming hydrogen chloride stream 6 may include an amount of impurities such as chlorosilanes (e.g., silicon tetrachloride and/or trichlorosilane). In various embodiments of the present disclosure, the hydrogen chloride stream 6 comprises at least about 80 vol % hydrogen chloride, at least about 90 vol %, at least about 95 vol % or even at least about 99 vol % hydrogen chloride (e.g., from about 80 vol % to about 99 vol % or from about 90 vol % to about 99 vol %).

The chlorination reactor 7 may include an amount of catalyst to promote formation of trichlorosilane relative to formation of silicon tetrachloride in the chlorinated product gas 10. For instance, the chlorination reactor 7 may include a group VIII metal catalyst (e.g., iron, cobalt, nickel, vanadium and/or platinum) or a catalyst containing aluminum, copper or titanium metal as disclosed in U.S. Pat. No. 5,871,705, which is incorporated herein by reference for all relevant and consistent purposes. The reactor 7 may also include an amount of one or more alkali metal compounds (e.g., lithium chloride, sodium chloride, potassium chloride, cesium chloride, rubidium chloride, sodium sulfate and/or sodium nitrate) to increase the selectivity toward trichlorosilane. The reactor 7 may be operated at from about 1.1 times to about 8 times the minimum fluidization velocity or from about 1.5 to about 4 times the minimum fluidization velocity.

The conversion of hydrogen chloride in the chlorination reactor 7 may vary depending on the reaction conditions and, typically, will be at least about 50%, at least about 65%, at least about 80%, at least about 90% and in some embodiments, conversion may approach 100% (e.g., from about 50% to about 100% or from about 80% to about 100%). Selectivity toward trichlorosilane may be at least about 50%, at least about 65% or even at least about 80% (e.g., from about 50% to about 90% or from about 70% to about 90%).

The chlorinated product gas 10 is introduced into a purification system 4 to produce a purified trichlorosilane stream 20 and a purified silicon tetrachloride stream 22. The purification system 4 may also separate hydrogen and hydrogen chloride 26 from the purified trichlorosilane 20 and purified silicon tetrachloride 22 and may separate various metal impurities (e.g., metal chlorides) from the gas streams 20, 22. The trichlorosilane stream 20 may be purified to contain less than about 10 vol % of compounds other than trichlorosilane (e.g., silicon tetrachloride) and preferably contains less amounts of impurities such as, less than about 5 vol %, less than about 1 vol %, less than about 0.1 vol % or even less than about 0.001 vol % of compounds other than trichlorosilane. Typically, the purified silicon tetrachloride stream 22 contains at least about 50 wt % silicon tetrachloride and, in some embodiments, at least about 60 wt %, at least about 70 wt %, at least about 80 wt % or even at least about 90 wt % silicon tetrachloride. In this regard, it should be understood that it is acceptable for the silicon tetrachloride stream 22 to be relatively impure (e.g., for the purity to be as low as 50 wt % or even lower) as the silicon tetrachloride stream is further processed to form trichlorosilane as described below.

The purified trichlorosilane stream 20 is introduced into the fluidized bed reactor 30 in which it fluidizes growing silicon seed particles to produce polycrystalline silicon which may be withdrawn from the reactor 30 as polycrystalline silicon product 27. Polycrystalline silicon 27 is produced from trichlorosilane 20 with formation of silicon tetrachloride by-product according to the following reactions, $$SiHCl_3+H_2 \rightarrow Si+3HCl \quad (5),$$

$$SiHCl_3+HCl \rightarrow SiCl_4+H_2 \quad (6).$$

In addition to trichlorosilane 20, hydrogen 29 is introduced into the fluidized bed reactor 30 as a carrier gas and to improve the overall conversion to polycrystalline silicon 27. The fluidized bed reactor 30 may be operated in accordance with U.S. application Ser. No. 12/910,465, filed Oct. 22, 2010, published as U.S. Pat. Pub. No. 2012/0100059, which is incorporated herein by reference for all relevant and consistent purposes. For instance, trichlorosilane 20 may be directed to the core region of the reactor 30 and the overall concentration of trichlorosilane introduced into the reactor may be at least about 20% by volume (e.g., from about 20% to about 50% by volume). Incoming feed gases may be at a temperature of less than about 350° C. The reactor 30 may be operated at less than about 90% equilibrium and with a residence time of less than about 10 seconds. The reactor 30 may be operated at a pressure of from about 3 bar to about 8 bar and the reaction gases may be heated to a temperature of at least about 700° C. (e.g., from about 700° C. to about 1300° C.). The gas velocity through the fluidized bed reactor 30 may be generally maintained at a velocity of from about 1 to about 8 times the minimum fluidization velocity necessary to fluidize the particles within the fluidized bed. The mean diameter of the particulate polycrystalline silicon that is withdrawn from the reactor 30 may be from about 800 μm to about 1200 μm. Quench gases may be introduced into the reactor 30 (e.g., at a freeboard region of the reactor) to reduce the temperature of the effluent gas 32 before being discharged from the reactor to suppress formation of silicon dust. The fluidized bed reactor may include an outer shell in which an inert gas is maintained at a pressure above the pressure of the process gases (e.g., a pressure within the range of about 0.005 bar to about 0.2 bar) to ensure process gases do not flow through cracks and holes within the reaction chamber.

In some embodiments of the present disclosure, the conversion of trichlorosilane in the fluidized bed reactor may be at least about 40%, at least about 55%, at least about 70% or even at least about 80% (e.g., from about 40% to about 90% or from about 55% to about 90%). The selectivity toward deposited silicon may be at least about 10%, at least about 15%, at least about 20%, at least about 25% or even at least about 30% (e.g., from about 15% to about 40% or from about 20% to about 30%).

The effluent gas 32 that exits the reactor 30 includes silicon tetrachloride, unreacted trichlorosilane and hydrogen. The effluent gas 32 may also contain minor amounts of other gases (e.g., hydrogen chloride) and silicon dust. In some embodiments of the present disclosure, the effluent gas 32 may contain at least about 10 vol % silicon tetrachloride, at least about 15 vol %, at least about 20 vol % or at least about 30 vol % silicon tetrachloride (e.g., from about 10 vol % to about 40 vol % or from about 10 vol % to about 20 vol % silicon tetrachloride). The effluent gas 32 may include at least about 10 vol % unreacted trichlorosilane, at least about 15 vol %, at least about 20 vol % or at least about 30 vol % unreacted trichlorosilane (e.g., from about 10 vol % to about 40 vol % or from about 10 vol % to about 20 vol % unreacted trichlorosilane). The bulk of the remainder of the effluent gas is typically hydrogen. For instance, the effluent gas 32 that exits the fluidized bed reactor 30 may include at least about 40 vol % hydrogen, at least about 50 vol %, at least about 60 vol %, at least about 70 vol %, at least about 80 vol % or even at least about 90 vol % hydrogen (e.g., from about 40 vol % to about 90 vol % or from about 60 vol % to about 80 vol %). The amount of hydrogen chloride in the effluent gas 32 may be less than about 5 vol % and is typically less than about 1 vol % (e.g., from about 0.1 vol % to about 5 vol %). The amount of silicon dust in the effluent gas may be from about 0.1 wt % to about 5 wt %. In this regard, it should be understood that the above-referenced percentage inclusion for the recited components are exemplary and other relative amounts of components may be used without departing from the scope of the present disclosure.

The effluent gas 32 is introduced into an effluent gas separator 50 to separate hydrogen (and hydrogen chloride if present) 31 from silicon tetrachloride and unreacted trichlorosilane 36. Before introduction into the effluent gas separator 50, the gas may pass through a particulate separator (not shown) to remove silicon dust produced as a by-product of the thermal decomposition of trichlorosilane. The separated silicon tetrachloride and trichlorosilane 36 may be recycled back to the purification system 4 for further use. The hydrogen (and any hydrogen chloride) 31 is introduced into a separation system 52 to separate hydrogen 54 and hydrogen chloride 6 which is more fully described below.

The separator 50 may be constructed according to any of the methods for separating gaseous components as appreciated by those of skill in the art. In some embodiments, the separator 50 is a vapor-liquid separator. Examples of such vapor-liquid separators include vessels in which the pressure and/or temperature of the incoming gas is reduced causing the lower boiling-point gases (e.g., silicon tetrachloride and trichlorosilane) to condense and separate from higher boiling point gases (e.g., hydrogen and hydrogen chloride). Suitable vessels include vessels which are commonly referred to in the art as "knock-out drums." Optionally, the vessel may be cooled to promote separation of gases. Alternatively, the separator 50 may be one or more distillation columns.

Silicon tetrachloride 22 removed from the purification system 4 is introduced into a hydrogenation reactor 60 to produce trichlorosilane. Silicon tetrachloride 22 discharged from the purification system 4 includes silicon tetrachloride that is produced as a by-product in the chlorination reactor 7 and as a by-product in the polycrystalline silicon fluidized bed reactor 30. In addition to silicon tetrachloride 22, hydrogen 57 from the separation system 52 is introduced into the hydrogenation reactor 60. Silicon tetrachloride 22 that is removed from the purification system 4 is converted to trichlorosilane according to the following reaction, $$SiCl_4 + H_2 \rightarrow SiHCl_3 + HCl \qquad (7).$$ 

The hydrogenation reactor 60 may be a bubbler in which hydrogen 57 is bubbled through liquid silicon tetrachloride 22 to form trichlorosilane. Alternatively, silicon tetrachloride 22 is vaporized and the hydrogen 57 and silicon tetrachloride 22 are heated and reacted in a pressurized reaction vessel. In this regard, any vessel suitable for the hydrogenation reaction as appreciated by those of skill in the art may be used without limitation. The contents of the reaction vessel may be heated to a temperature of at least about 800° C. to convert silicon tetrachloride to trichlorosilane. In some embodiments, silicon tetrachloride 22 and hydrogen 57 are heated to a temperature of at least about 900° C., at least about 1000° C. or even at least about 1100° C. (e.g., from about 800° C. to about 1500° C., from about 800° C. to about 1200° C. or from about 1000° C. to about 1200° C.). Preferably, the reaction vessel is pressurized to promote formation of trichlorosilane. For instance, the hydrogenation reactor 60 may be operated at a pressure of at least about 2 bar and, in other embodiments, at least about 5 bar, at least about 10 bar or even at least about 15 bar (e.g., from about 2 bar to about 20 bar or from about 8 bar to about 15 bar). The ratio of hydrogen to silicon tetrachloride introduced into the rector 60 may vary depending on the reaction conditions. Use of a stoichiometric excess of hydrogen typically results in increased conversion to trichlorosilane. In various embodiments, the molar ratio of hydrogen to silicon tetrachloride is at least about 1:1, at least about 2:1 or even at least about 3:1 (e.g., from about 1:1 to about 5:1 or from about 1:1 to about 3:1).

Generally, at least about 20% of silicon tetrachloride is converted to trichlorosilane in the hydrogenation reactor 60 with conversions of at least about 30%, at least about 40% or even at least about 50% being possible (e.g., from about 20% to about 60% conversion). The resulting hydrogenated gas 63 contains trichlorosilane, unreacted silicon tetrachloride, unreacted hydrogen and hydrogen chloride. Depending on the amount of excess hydrogen 57 added to the reactor, the amount of trichlorosilane in the hydrogenated gas 63 may be at least about 5 vol % and, in other embodiments, at least about 10 vol %, at least about 25 vol %, or at least about 40 vol % (e.g., from about 5 vol % to about 40 vol %, from about 5 vol % to about 20 vol % or from about 5 vol % to about 10 vol %). Likewise, the amount of hydrogen chloride in the hydrogenated gas may be at least about 5 vol % and, in other embodiments, at least about 10 vol %, at least about 25 vol %, or at least about 40 vol % (e.g., from about 5 vol % to about 40 vol %, from about 5 vol % to about 20 vol % or from about 5 vol % to about 10 vol %). The amount of unreacted silicon tetrachloride may be at least about 10 vol %, at least about 20 vol %, or at least about 30 vol % or at least about 40 vol % of the hydrogenated gas stream (e.g., from about 10 vol % to about 40 vol %, from about 10 vol % to about 30 vol % or from about 15 vol % to about 25 vol %). The remainder of the hydrogenated gas 63 is typically hydrogen. For instance, the hydrogenated gas 63 may include at least about 40 vol % hydrogen or, as in other embodiments, at least about 50 vol %, at least about 60 vol %, at least about 70 vol % or even at least about 80 vol % hydrogen (e.g., from about 40 vol % to about 90 vol %, from about 50 vol % to about 80 vol % or from about 60 vol % to about 80 vol %).

The hydrogenated gas 63 is introduced into a hydrogenated gas separator 70 to separate trichlorosilane and unreacted silicon tetrachloride 73 from hydrogen and unreacted hydrogen chloride 75. The trichlorosilane and unreacted silicon tetrachloride 73 are introduced into the gas purification system 4 to recover trichlorosilane 20 and to reintroduce silicon tetrachloride 73 to the hydrogenation reactor 60. Separated hydrogen and hydrogen chloride 75 are introduced into the separation system 52 described below. The hydrogenated gas separator 70 may be a vapor-liquid separator such as a knock-out drum or may be a distillation column as described above with reference to the separator 50.

The separation system 52 separates hydrogen 54 from hydrogen chloride 6. Hydrogen 54 may be used in the hydrogenation reactor 60 and/or the fluidized bed reactor 30. Hydrogen chloride 6 is used in the chlorination reactor 7. Hydrogen and hydrogen chloride steams that are introduced into the separation system 52 include hydrogen and/or hydrogen chloride 26 from the purification system 4, hydrogen and/or hydrogen chloride 31 from the separator 50 and hydrogen and/or hydrogen chloride from the hydrogenated gas separator 70.

Figure 2:
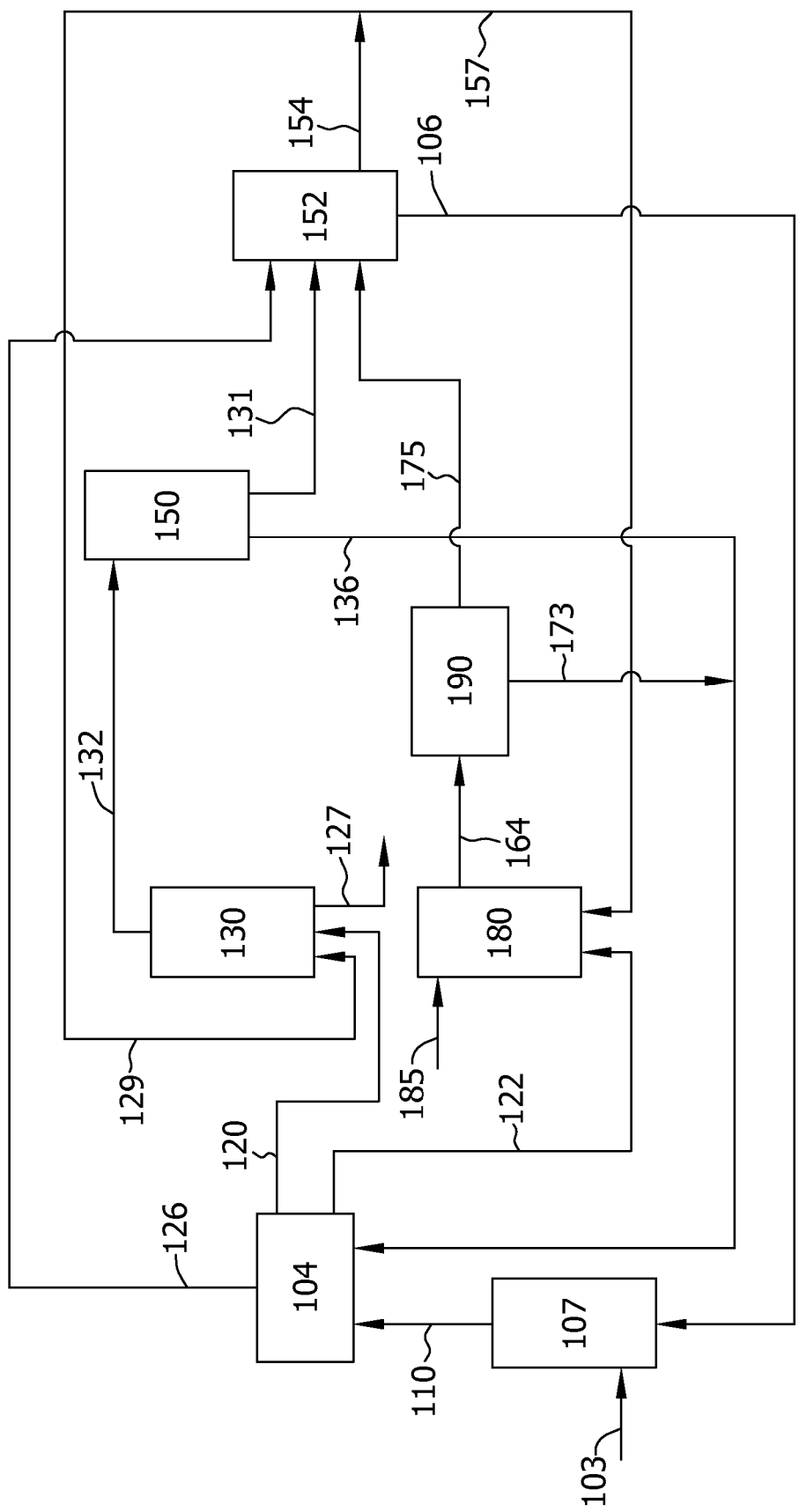
FIG. 2 is a flow diagram of a system for producing polycrystalline silicon by the thermal decomposition of trichlorosilane according to a second embodiment of the present disclosure.

An alternative embodiment for producing polycrystalline silicon is shown in FIG. 2. In this regard, it should be noted that the process steams and apparatus shown in FIG. 2 that are analogous to those of FIG. 1 are designated by the corresponding reference number of FIG. 1 plus "100" (e.g., part 4 becomes part 104). The process of FIG. 2 is substantially the same as that of FIG. 1; however, FIG. 2 includes a second fluidized bed reactor 180 rather than a hydrogenation reactor 60 (FIG. 1). In this regard, it should be understood that in certain embodiments, the process may use both a hydrogenation reactor 60 (FIG. 1) and a second fluidized bed reactor 180 (FIG. 2) operated in series or parallel without departing from the scope of the present disclosure.

In the process of FIG. 2, silicon tetrachloride 122 removed from the purification system 104 is introduced into the second fluidized bed reactor 180. Hydrogen 157 from the separation system 152 is introduced into the fluidized bed reactor 180 as a carrier gas. A source of silicon 185 is also introduced into the second fluidized bed reactor 180. The particulate silicon 185 is fluidized by the hydrogen 157 and silicon tetrachloride gas 122 introduced into the reactor 180. Introduction of a source of silicon into the fluidized bed reactor 180 allows silicon tetrachloride to be directly hydrogenated to produce trichlorosilane according to the following reaction,

$$3SiCl_4 + 2H_2 + Si \rightarrow 4SiHCl_3 \qquad (8).$$

The direct hydrogenation reaction (8) may be performed in accordance with known operating parameters such as those described in U.S. Pat. No. 4,526,769 or U.S. Pat. No. 4,676,967, both of which are incorporated herein by reference for all relevant and consistent purposes. The fluidized bed reactor 180 may be operated at a temperature of at least about 500° C. and, in some embodiments, at least about 550° C., at least about 600° C., at least about 650° C. or at least about 700° C. (e.g., from about 500° C. to about 750° C. or from about 550° C. to about 650° C.). Silicon tetrachloride 122 and/or hydrogen 157 may be preheated prior to the introduction into the fluidized bed reactor 180 and/or heat may extraneously be added to the reactor 180 by use of external heating means. The fluidized bed reactor 180 may be operated at an elevated pressure such as pressures of at least about 3 bar or at least about 6 bar; however, relatively high pressures such as at least about 20 bar, at least about 25 bar, at least about 30 bar or at least about 35 bar (e.g., from about 20 bar to about 35 bar) may be used to minimize corrosion and increase trichlorosilane yield.

The source of silicon 185 may be metallurgical grade silicon; however, it should be understood that other sources of silicon may be used such as, for example, sand (i.e., $SiO_2$), quartz, flint, diatomite, mineral silicates, fluorosilicates and mixtures thereof. The particle size of the silicon may be from about 10 μm to about 500 μm or from about 50 μm to about 300 μm. Silicon 185, silicon tetrachloride 122 and hydrogen 157 may be added in substantially equimolar amounts; however, hydrogen may be used as a carrier gas and may be added in a stoichiometric excess. The molar ratio of hydrogen to silicon tetrachloride may be at least about 2:3, at least about 1:1, at least about 2:1, at least about 3:1 or at least about 5:1 (e.g., from about 2:3 to about 5:1).

In some embodiments of the present disclosure, a catalyst may be added to the fluidized bed reactor 180 to achieve higher conversion to trichlorosilane. In some embodiments, a copper-containing catalyst may be added to the second fluidized bed reactor 180. Examples of such a catalyst include copper oxides and copper chlorides such as, for example, CuO, $Cu_2O$, CuCl and $CuCl_2$. Regardless of whether a catalyst is employed, at least about 20% of silicon tetrachloride is converted to trichlorosilane in the second fluidized bed reactor 180 with conversions of at least about 30%, at least about 40% or even at least about 50% being possible (e.g., from about 20% to about 60% conversion).

Figure 5:
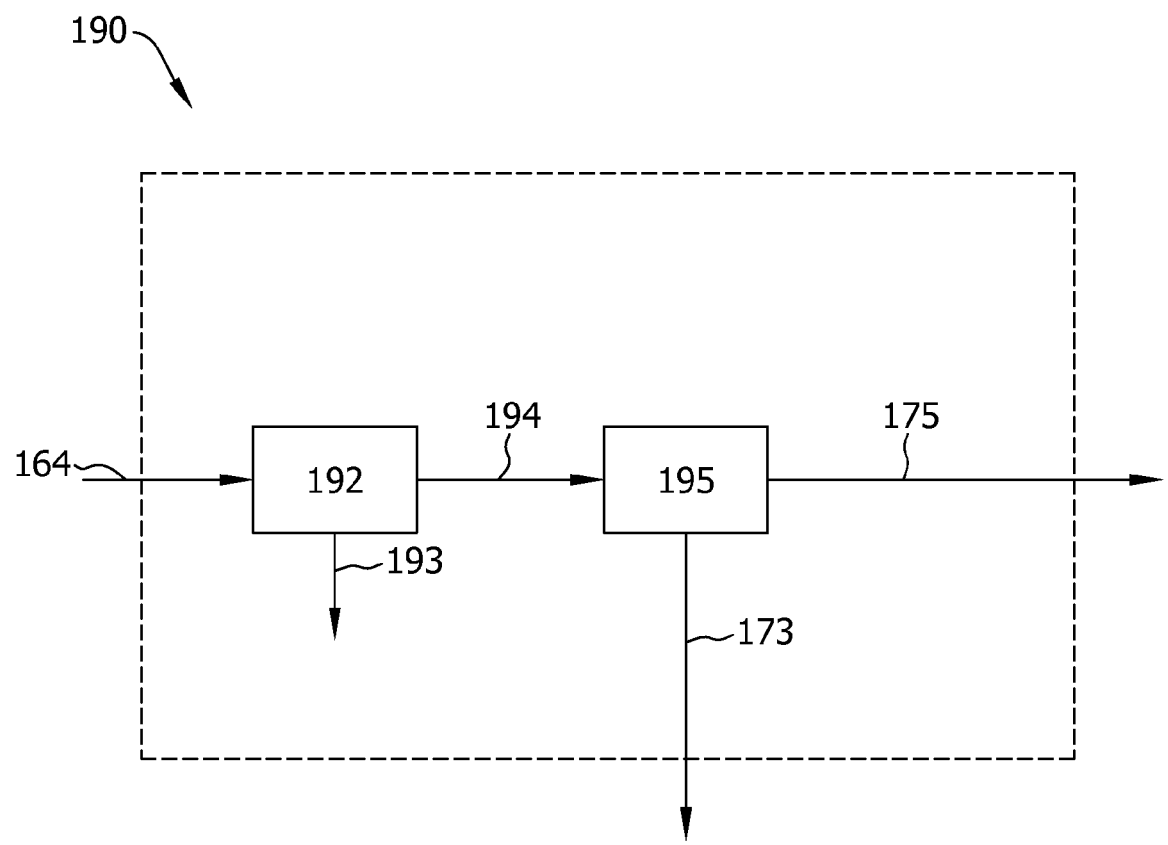
FIG. 5 is a flow diagram of a second effluent gas separation system for purifying a second effluent gas discharged from a second fluidized bed reactor for hydrogenating silicon tetrachloride.

As shown in FIG. 2, the second effluent gas 164 from the second fluidized bed reactor 180 is introduced into a second effluent gas separation system 190. The second effluent gas 164 includes trichlorosilane, unreacted silicon tetrachloride, unreacted hydrogen and may contain other compounds such as hydrogen chloride and dichlorosilane. In several embodiments of the present disclosure, a system 190 as shown in FIG. 5 may be used. The system 190 includes a particulate separator 192 that removes silicon particulate (e.g., dust) 193 that is carried out of the second fluidized bed reactor 180. Suitable particulate separators include, for example, bag filters, cyclonic separators and liquid scrubbers. Silicon dust 193 may be recycled back to the second fluidized bed reactor 180 for further conversion to trichlorosilane. The dust-depleted effluent gas 194 is introduced into a separator 195. The separator 195 may be a vapor-liquid separator as described above (e.g., knock-out drum) with reference to separator 50 (FIG. 1) or may be a distillation column. The separator 195 separates trichlorosilane and unreacted silicon tetrachloride 173 from hydrogen and hydrogen chloride (if any) 175. The trichlorosilane and reacted silicon tetrachloride 173 are introduced into the gas purification system 104 (FIG. 2) to recover trichlorosilane 120 and reintroduce silicon tetrachloride 122 to the second fluidized bed reactor 180. Separated hydrogen and hydrogen chloride 175 are introduced into the separation system 152.

Figure 3:
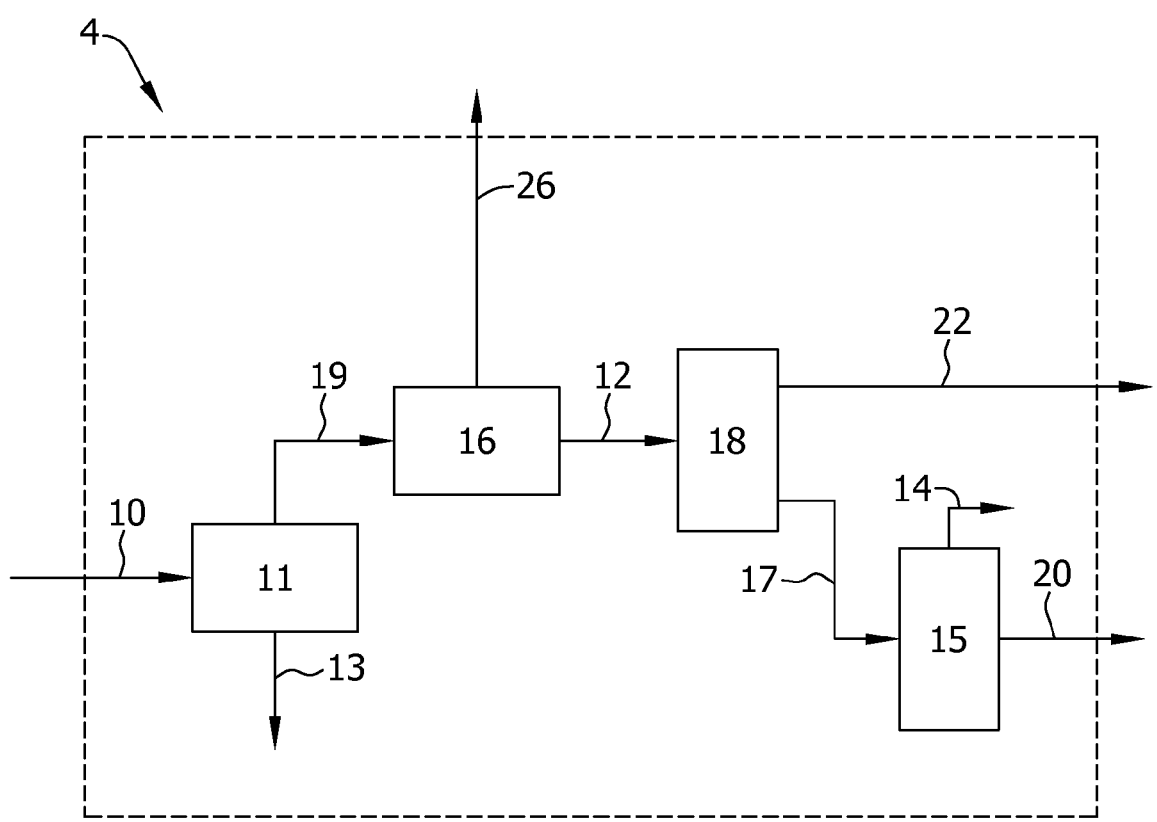
FIG. 3 is a flow diagram of a purification system for purifying an effluent gas containing trichlorosilane and silicon tetrachloride according to a first embodiment of the present disclosure.

An exemplary purification system 4 for use in embodiments of the present disclosure is shown in FIG. 3. In this regard, it should be understood that the purification system 104 (FIG. 2) may be the same or similar to the purification system 4 shown in FIG. 3 without departing from the scope of the present disclosure. The purification system 4 includes a particulate separator 11 that removes silicon dust 13 formed during decomposition of trichlorosilane from the chlorinated product gas 10. Suitable particulate separators include, for example, sintered metal filters, bag filters, cyclonic separators and liquid scrubbers. Silicon dust 13 may be withdrawn as waste or may be recycled to the first fluidized bed reactor 30. Dust-depleted chlorinated product gas 19 is introduced into a chlorinated gas separator 16 to separate trichlorosilane and silicon tetrachloride 12 from hydrogen and unreacted hydrogen chloride 26. The chlorinated gas separator 16 may be a vapor-liquid separator as described above (e.g., knock-out drum) with reference to separator 50 (FIG. 1) or may be a distillation column. The hydrogen and unreacted hydrogen chloride 26 are introduced into the separation system 52 (FIG. 1) to separate hydrogen and hydrogen chloride. The separated trichlorosilane and silicon tetrachloride 12 are introduced into a silicon tetrachloride separator 18 to separate silicon tetrachloride 22 from trichlorosilane and produce a trichlorosilane feed gas 17. The silicon tetrachloride separator 18 may be a distillation column or any other apparatus suitable to remove silicon tetrachloride from trichlorosilane. The trichlorosilane feed gas 17 is introduced into a trichlorosilane purifier 15 to remove impurities from the feed gas. The purifier 15 may also be a distillation column or any other apparatus suitable to remove impurities 14 from trichlorosilane-containing gases. The impurities 14 may be removed as waste or may be recycled (such as by introduction into the separator system 52). The purified trichlorosilane feed gas 20 is introduced into the fluidized bed reactor 30 (FIG. 1) to produce polycrystalline silicon 27.

Figure 4:
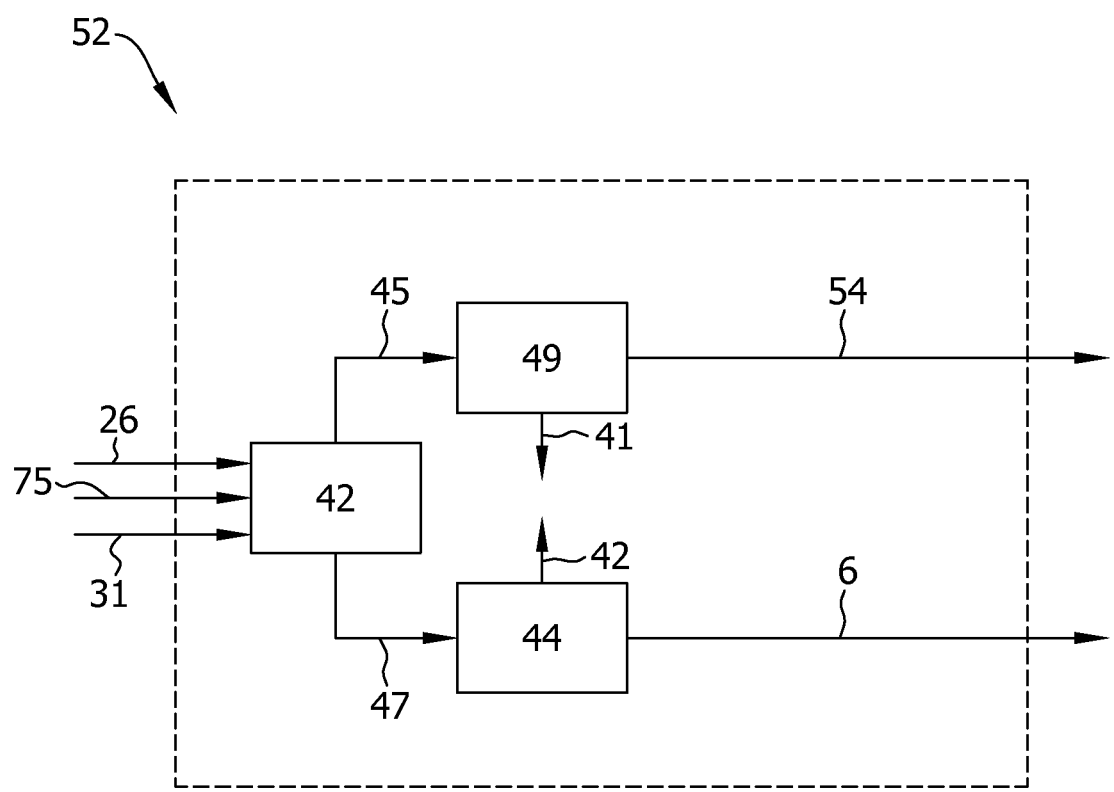
FIG. 4 is a flow diagram of a separation system for separating and purifying hydrogen and hydrogen chloride according to a first embodiment of the present disclosure.

An embodiment of the separator system 52 is shown in FIG. 4. In this regard, it should be understood that the separator system 152 (FIG. 2) may be the same or similar to the separator system 52 shown in FIG. 4. Hydrogen and hydrogen chloride 26 from the purification system 4, hydrogen and hydrogen chloride 31 from the separator 50 and hydrogen and hydrogen chloride 75 from the hydrogenated gas separator 70 are introduced into a hydrogen separator 42 to produce a hydrogen recycle gas 45 and a hydrogen chloride recycle gas 47. In this regard, it should be understood that one or more of the hydrogen and hydrogen chloride gases 26, 31, 75 may be first introduced into a purifier (not shown) such as a distillation column for purifying the hydrogen and hydrogen chloride (e.g., by removing any chlorides such as silicon tetrachloride, trichlorosilane and/or dichlorosilane) prior to introduction into the hydrogen separator 42. In embodiments wherein such a purifier is used, the chlorides may be recycled to the purification system 4.

The hydrogen recycle gas 45 is introduced into a hydrogen purifier 49 to remove impurities 41 from the hydrogen recycle gas 45. The impurities 41 may be removed from the system as waste or may be recycled (e.g., introduced into the purification system 4). The purified hydrogen recycle gas 54 is introduced into the fluidized bed reactor 30 or hydrogenation reactor 60 (FIG. 1) or the second fluidized bed reactor 180 (FIG. 2). The hydrogen chloride recycle gas 47 is introduced into a hydrogen chloride purifier 44 to remove impurities 42 from the hydrogen chloride recycle gas 47. The impurities 42 (e.g., chlorosilanes) may be removed from the system as waste or may be recycled (e.g., introduced into the purification system 4). The purified hydrogen chloride recycle gas 6 is recycled to the chlorination reactor 7.

The hydrogen separator 42 may be any type of separator suitable to separate hydrogen from hydrogen chloride. An exemplary separator 42 is a bubbler in which hydrogen and hydrogen chloride are bubbled through a vessel containing a fluid (e.g., water) and, typically, in which the fluid is continuously introduced (not shown) and removed. Hydrogen chloride is adsorbed within the fluid (e.g., water) while separated hydrogen is removed from the vessel as a gas. Hydrogen 45 is sent to the hydrogen purifier 49 which may be an adsorber or any other apparatus suitable for removing impurities from hydrogen gases. The hydrogen chloride purifier 44 may be one or more distillation columns. In this regard, it should be understood that other methods and apparatus for separating and purifying hydrogen and hydrogen chloride other than those recited above may be used in any combination (e.g., in series or in parallel) without departing from the scope of the present disclosure.

In several embodiments of the present disclosure, the molar ratio of chlorine (i.e., based on the moles of chlorine atoms (Cl) rather than moles of the diatomic gas ($Cl_2$)) added as a make-up, including chlorine gas itself and chlorine atoms that form part of other chlorine-containing compounds (e.g., HCl, $SiHCl_3$ and/or $SiCl_4$) that are added in a make-up stream, to polycrystalline silicon product that is produced (not including silicon dust) is less than about 2:1 and, as in other embodiments, less than about 1:1, less than about 1:1.2, less than about 1:1.5, less than about 1:2 or less than about 1:2.5 (e.g., from about 2:1 to 1:5 or from about 1:1 to about 1:5). In addition or alternatively, the molar ratio of hydrogen (i.e., based on the moles of hydrogen atoms (H) rather than moles the diatomic gas ($H_2$)) added as a make-up, including hydrogen gas itself and hydrogen atoms that form part of other hydrogen-containing compounds (e.g., HCl, $SiHCl_3$, and/or $SiH_4$) that are added in a make-up stream (but excluding hydrogen included within water that is used to separate hydrogen from hydrogen chloride in a bubbler-type system), may be less than about 1:1 and, as in other embodiments, less than about 1:2, less than about 1:3, less than about 1:5, less than about 1:10 (e.g., from about 1:1 to 1:20 or from about 1:2 to about 1:10). In some embodiments, no hydrogen is added to the process as a make-up stream. Additionally, in some embodiments, no trichlorosilane or silicon tetrachloride are added to the system; rather, these compounds are produced and consumed within the system itself.

Closed-Loop Systems for Producing Polycrystalline Silicon

The processes described above may be incorporated into a substantially closed-loop system for producing polycrystalline silicon. The processes above may be substantially closed-loop with respect to trichlorosilane, hydrogen and/or hydrogen chloride. In several embodiments of the present disclosure and as shown in FIG. 1, the system includes a chlorination reactor 7 in which hydrogen chloride is contacted with silicon to produce trichlorosilane and silicon tetrachloride. The system also includes a fluidized bed reactor 30 in which trichlorosilane is decomposed to produce polycrystalline silicon and a hydrogenation reactor 60 in which silicon tetrachloride and hydrogen are introduced to produce trichlorosilane. The system may include a conveying apparatus for conveying trichlorosilane from the hydrogenation reactor 60 to the fluidized bed reactor 30 and a conveying apparatus for conveying trichlorosilane from the chlorination reactor 7 to the fluidized bed reactor 30.

The system may also include a purification system 4 to which trichlorosilane and silicon tetrachloride are introduced to separate trichlorosilane and silicon tetrachloride. The system includes a conveying apparatus for conveying trichlorosilane from the purification system 4 to the fluidized bed reactor 30 and a conveying apparatus for conveying silicon tetrachloride from the purification system 4 to the hydrogenation reactor 60. With further reference to FIG. 1, the system may include an effluent gas separator 50 to which effluent gas from the fluidized bed reactor 30 is introduced, the effluent gas separator 50 separating hydrogen from trichlorosilane and silicon tetrachloride. A conveying apparatus conveys trichlorosilane and silicon tetrachloride from the effluent gas separator 50 to the purification system 4.

The system includes a hydrogenated gas separator 70 to which hydrogenated gas from the hydrogenation reactor is introduced. The hydrogenated gas separator 70 separates trichlorosilane and unreacted silicon tetrachloride from hydrogen and unreacted hydrogen chloride. A conveying apparatus conveys trichlorosilane and unreacted silicon tetrachloride to the purification system 4.

The system may also include a separation system 52 to which hydrogen and hydrogen chloride from the hydrogenated gas separator are introduced to separate hydrogen and hydrogen chloride. A conveying apparatus conveys hydrogen chloride from the separation system 52 to the chlorination reactor 7. A conveying apparatus conveys hydrogen from the separation system 52 to at least one of the fluidized bed reactor 30 and hydrogenation reactor 60.

A system for producing polycrystalline silicon according to a second embodiment of the present disclosure is shown in FIG. 2. The system is similar to the system of FIG. 1; however, the system of FIG. 2 includes a second fluidized bed reactor 180 in which silicon is added to produce trichlorosilane according to reaction (8) above. The system includes a chlorination reactor 107 in which hydrogen chloride is contacted with silicon to produce trichlorosilane and silicon tetrachloride. The system also includes a first fluidized bed reactor 130 in which trichlorosilane is decomposed to produce polycrystalline silicon and a second fluidized bed reactor 180 in which silicon tetrachloride is converted to trichlorosilane. A conveying apparatus conveys trichlorosilane from the chlorination reactor 107 to the first fluidized bed reactor 130.

The system includes a purification system 104 to which trichlorosilane and silicon tetrachloride are introduced to separate trichlorosilane and silicon tetrachloride. A conveying apparatus conveys trichlorosilane from the purification system 104 to the first fluidized bed reactor 130 and a conveying apparatus conveys silicon tetrachloride from the purification system 104 to the second fluidized bed reactor 180.

The system may include a first effluent gas separator 150 to which effluent gas from the first fluidized bed reactor 130 is introduced. The effluent gas separator 150 separates hydrogen from trichlorosilane and silicon tetrachloride. A conveying apparatus conveys trichlorosilane and silicon tetrachloride from the first effluent gas separator 150 to the purification system 104.

The system includes a second effluent gas separator system 190 to which a second effluent gas from the second fluidized bed reactor 180 is introduced. The second effluent gas separator 190 separates trichlorosilane and unreacted silicon tetrachloride from unreacted hydrogen. A conveying apparatus conveys trichlorosilane and unreacted silicon tetrachloride to the purification system 104.

The system according to the second embodiment of the present disclosure may also include a separation system 152 to which hydrogen and hydrogen chloride from the second effluent gas separator 190 are introduced to separate hydrogen and hydrogen chloride. A conveying apparatus conveys hydrogen chloride from the separation system 152 to the chlorination reactor 130 and a conveying apparatus conveys hydrogen from the separation system 152 to at least one of the first fluidized bed reactor 107 and the second fluidized bed reactor 180.

In this regard, suitable conveying apparatus for use in the systems of FIG. 1 and FIG. 2 are conventional and well known in the art. Suitable conveying apparatus for the transfer of gases include, for example, a recirculation fan or blower and suitable conveying apparatus for transfer of solids include, for example, drag, screw, belt and pneumatic conveyors. In this regard, it should be understood that, use of the phrase "conveying apparatus" herein is not meant to imply direct transfer from one unit of the system to another but rather only that the material is transferred from one unit to another by any number of indirect transfer parts and/or mechanisms. For instance, material from one unit may be conveyed to further processing units (e.g., purification) and then conveyed to the second unit. In this example, each unit of conveyance including the intermediate processing equipment itself may be considered to be the "conveying apparatus" and the phrase "conveying apparatus" should not be considered in a limiting sense.

Preferably, all equipment utilized in the systems for producing polycrystalline silicon is resistant to corrosion in an environment that includes exposure to compounds used and produced within the system. Suitable materials of construction are conventional and well-known in the field of the invention and include, for example, carbon steel, stainless steel, MONEL alloys, INCONEL alloys, HASTELLOY alloys, nickel, graphite (e.g., extruded or iso-molded) and silicon carbide (e.g., converted graphite or extruded).

As shown in FIG. 1 and in FIG. 2, the systems and processes are substantially closed loop with respect to hydrogen, hydrogen chloride and trichlorosilane in that the system does not include hydrogen, hydrogen chloride or trichlorosilane in the inlet stream 3 (and in streams 103, 185 as in FIG. 2) and these compounds are not removed from the system in outlet stream 27 (or 127 as in FIG. 2). In this regard, it should be understood that amounts of hydrogen, hydrogen chloride or trichlorosilane may be removed from the system in a purge stream and may be fed into the system or process as in a make-up stream. Make-up of these compounds may be achieved by addition of the compounds to any process stream as may be determined by those of skill in the art.

It should be understood that the processes and systems described above may include more than one of any of the recited units (e.g., reactors and/or separation units) and that multiple units may be operated in series and/or in parallel without departing from the scope of the present disclosure. Further in this regard, it should be understood that the process and systems that are described are exemplary and the processes and systems may include additional units which carry additional functions without limitation.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. A substantially closed-loop process for producing polycrystalline silicon, the process comprising:
   introducing trichlorosilane and hydrogen to a first fluidized bed reactor to produce polycrystalline silicon and a first effluent gas comprising silicon tetrachloride, hydrogen and unreacted trichlorosilane;
   introducing silicon and an amount of silicon tetrachloride and hydrogen from the effluent gas into a second fluidized bed reactor to produce a second effluent gas comprising trichlorosilane and unreacted hydrogen and unreacted silicon tetrachloride;

contacting hydrogen chloride and silicon to produce trichlorosilane and silicon tetrachloride;

introducing the trichlorosilane produced by contacting hydrogen chloride and silicon into the first fluidized bed reactor to produce polycrystalline silicon; and adding chlorine to one or more process streams as a make-up, wherein the molar ratio of chlorine added as a make-up to polycrystalline silicon product that is produced is less than about 2:1.

2. The process as set forth in claim 1 wherein the hydrogen chloride and silicon are introduced into a chlorination reactor to produce a chlorinated product gas comprising the trichlorosilane and silicon tetrachloride, the process comprising introducing the chlorinated product gas into a purification system to produce a purified trichlorosilane stream and a purified silicon tetrachloride stream, the purified trichlorosilane stream being introduced into the first fluidized bed reactor.

3. The process as set forth in claim 2 wherein the first effluent gas is introduced into a first effluent gas separator to separate hydrogen from trichlorosilane and silicon tetrachloride, the trichlorosilane and silicon tetrachloride being introduced into the chlorinated gas purification system, the purified silicon tetrachloride stream being introduced into the second fluidized bed reactor.

4. The process as set forth in claim 3 wherein the first effluent gas separator is a vapor-liquid separator.

5. The process as set forth in claim 2 wherein the second effluent gas is introduced into a second effluent gas separator system to separate trichlorosilane and unreacted silicon tetrachloride from hydrogen, the trichlorosilane and unreacted silicon tetrachloride being introduced into the chlorinated gas purification system.

6. The process as set forth in claim 5 wherein the second effluent gas separator is a vapor-liquid separator.

7. The process as set forth in claim 5 wherein the second effluent gas comprises hydrogen and hydrogen chloride, wherein trichlorosilane and unreacted silicon tetrachloride are separated from hydrogen and hydrogen chloride, the hydrogen and hydrogen chloride being introduced into a separation system to separate hydrogen and hydrogen chloride, the separated hydrogen chloride being introduced into the chlorination reactor, the separated hydrogen being introduced into at least one of the first fluidized bed reactor and the second fluidized bed reactor.

8. The process as set forth in claim 2 wherein the chlorinated product gas comprises trichlorosilane, silicon tetrachloride, hydrogen and unreacted hydrogen chloride and wherein the purification system comprises a chlorinated gas separator, a silicon tetrachloride separator and a trichlorosilane purifier, wherein:

the chlorinated product gas is introduced into the chlorinated gas separator to separate trichlorosilane and silicon tetrachloride from hydrogen and unreacted hydrogen chloride;

the separated trichlorosilane and silicon tetrachloride are introduced into the silicon tetrachloride separator to separate silicon tetrachloride from trichlorosilane and produce a trichlorosilane feed gas;

the trichlorosilane feed gas is introduced into a trichlorosilane purifier to remove impurities from the feed gas; and the purified trichlorosilane feed gas is introduced into the first fluidized bed reactor to produce polycrystalline silicon.

9. The process as set forth in claim 8 wherein the chlorinated gas separator is a vapor-liquid separator, the silicon tetrachloride separator is a distillation column and the trichlorosilane purifier is a distillation column.

10. The process as set forth in claim 8 wherein the separated hydrogen and unreacted hydrogen chloride are introduced into a separation system to separate hydrogen and hydrogen chloride, the separated hydrogen chloride being introduced into the chlorination reactor, the separated hydrogen being introduced into at least one of the first fluidized bed reactor and the second fluidized bed reactor.

11. The process as set forth in claim 7 wherein the separation system comprises a hydrogen separator, a hydrogen purifier and a hydrogen chloride purifier, wherein:

the hydrogen and hydrogen chloride are introduced into the hydrogen separator to produce a hydrogen recycle gas and a hydrogen chloride recycle gas;

the hydrogen recycle gas is introduced into a hydrogen purifier to remove impurities from the hydrogen recycle gas;

the hydrogen chloride recycle gas is introduced into a hydrogen chloride purifier to remove impurities from the hydrogen chloride gas; and the purified hydrogen recycle gas is introduced into at least one of the first fluidized bed reactor and the second fluidized bed reactor; and the purified hydrogen chloride recycle gas is introduced into the chlorination reactor.

12. The process as set forth in claim 11 wherein the hydrogen separator is a bubbler, the hydrogen purifier is an adsorber and the hydrogen chloride purifier is a distillation column.

13. The process as set forth in claim 1 comprising adding hydrogen to one or more process streams as a make-up, wherein the molar ratio of hydrogen added as a make-up to polycrystalline silicon product that is produced is less than about 1:1.

14. The process as set forth in claim 1 wherein no hydrogen is added to the process as a make-up stream.

15. A substantially closed-loop process for producing polycrystalline silicon, the process comprising:

introducing trichlorosilane and hydrogen to a first fluidized bed reactor to produce polycrystalline silicon and a first effluent gas comprising silicon tetrachloride, hydrogen and unreacted trichlorosilane;

introducing the first effluent gas into a first effluent gas separator to separate hydrogen from trichlorosilane and silicon tetrachloride, the trichlorosilane and silicon tetrachloride being introduced into a chlorinated gas purification system to produce a purified trichlorosilane stream and a purified silicon tetrachloride stream;

introducing silicon, an amount of silicon tetrachloride from the purified silicon tetrachlorinated product stream and hydrogen from the first effluent gas into a second fluidized bed reactor to produce a second effluent gas comprising trichlorosilane, hydrogen chloride, unreacted hydrogen and unreacted silicon tetrachloride;

introducing the second effluent gas into a second effluent gas separator system to separate trichlorosilane and unreacted silicon tetrachloride from hydrogen, the trichlorosilane and unreacted silicon tetrachloride being introduced into the chlorinated gas purification system;

introducing hydrogen and hydrogen chloride from the second effluent gas into a separation system to separate hydrogen and hydrogen chloride, the separation system comprising a hydrogen separator that is a bubbler, a hydrogen purifier that is an adsorber and a hydrogen chloride purifier that is a distillation column, wherein:

the hydrogen and hydrogen chloride are introduced into the hydrogen separator to produce a hydrogen recycle gas and a hydrogen chloride recycle gas;

the hydrogen recycle gas is introduced into a hydrogen purifier to remove impurities from the hydrogen recycle gas;

the hydrogen chloride recycle gas is introduced into a hydrogen chloride purifier to remove impurities from the hydrogen chloride gas; and the purified hydrogen recycle gas is introduced into at least one of the first fluidized bed reactor and the second fluidized bed reactor;

introducing the purified hydrogen chloride recycle gas and silicon into a chlorination reactor to produce a chlorinated product gas comprising trichlorosilane and silicon tetrachloride;

introducing the chlorinated product gas into the chlorinated gas purification system;

introducing the purified trichlorosilane stream produced by contacting hydrogen chloride and silicon into the first fluidized bed reactor to produce polycrystalline silicon.

16. The process as set forth in claim 15 wherein the first effluent gas separator is a vapor-liquid separator.

17. The process as set forth in claim 15 wherein the second effluent gas separator is a vapor-liquid separator.

18. The process as set forth in claim 15 wherein the chlorinated product gas comprises trichlorosilane, silicon tetrachloride, hydrogen and unreacted hydrogen chloride and wherein the purification system comprises a chlorinated gas separator, a silicon tetrachloride separator and a trichlorosilane purifier, wherein:

the chlorinated product gas is introduced into the chlorinated gas separator to separate trichlorosilane and silicon tetrachloride from hydrogen and unreacted hydrogen chloride;

the separated trichlorosilane and silicon tetrachloride are introduced into the silicon tetrachloride separator to separate silicon tetrachloride from trichlorosilane and produce a trichlorosilane feed gas;

the trichlorosilane feed gas is introduced into a trichlorosilane purifier to remove impurities from the feed gas; and the purified trichlorosilane feed gas is introduced into the first fluidized bed reactor to produce polycrystalline silicon.

19. The process as set forth in claim 18 wherein the chlorinated gas separator is a vapor-liquid separator, the silicon tetrachloride separator is a distillation column and the trichlorosilane purifier is a distillation column.

20. The process as set forth in claim 18 wherein the separated hydrogen and unreacted hydrogen chloride are introduced into a separation system to separate hydrogen and hydrogen chloride, the separated hydrogen chloride being introduced into the chlorination reactor, the separated hydrogen being introduced into at least one of the first fluidized bed reactor and the second fluidized bed reactor.

21. The process as set forth in claim 15 wherein no hydrogen is added to the process as a make-up stream.

* * * * *